(12) United States Patent
Anayama et al.

(10) Patent No.: US 6,517,743 B2
(45) Date of Patent: Feb. 11, 2003

(54) EPOXY RESIN COMPOSITION HAVING HIGH NEUTRON SHIELDING ABILITY, AND A TRANSPARENT SHIELDING MATERIALS FOR NEUTRON OBTAINED BY CURING SAID EPOXY RESIN COMPOSITION

(75) Inventors: Yoshimasa Anayama, Kanuma (JP); Hiroshi Nakanishi, Sanda (JP); Kenji Watanabe, Tokyo (JP); Makoto Matsuura, Sanda (JP)

(73) Assignees: Sanoya Industry Co Ltd, Tochigi-Ken (JP); Tohto Resin Products Co Ltd, Tokyo (JP)

( * ) Notice: Subject to any disclaimer, the term of this patent is extended or adjusted under 35 U.S.C. 154(b) by 0 days.

(21) Appl. No.: 09/811,511

(22) Filed: Mar. 20, 2001

(65) Prior Publication Data

US 2001/0053817 A1 Dec. 20, 2001

(30) Foreign Application Priority Data

Apr. 28, 2000 (JP) ........................................ 2000-130975

(51) Int. Cl.$^7$ .................................................. G21C 7/24
(52) U.S. Cl. ................. 252/478; 250/515.1; 250/517.1; 250/518.1; 523/445
(58) Field of Search ........................... 250/515.1, 517.1, 250/518.1; 252/478; 523/445

(56) References Cited

U.S. PATENT DOCUMENTS 3,609,372 A * 9/1971 Vogel ...................... 250/518.1

* cited by examiner

*Primary Examiner*—Robert Dawson
*Assistant Examiner*—D. Aylward
(74) *Attorney, Agent, or Firm*—Sherman & Shalloway

(57) ABSTRACT

An epoxy resin composition which is cured transparent product having high neutron shielding capability, comprised by an epoxy resin without any not transparent inorganic substances and a hardener and characterized by said composition's viscosity at ambient temperatures is below 7000 mPa·s and said composition is curable at said temperatures.

5 Claims, 1 Drawing Sheet

Schematic arrangement of a neutron source, shielding materials and detector location (Monte Carlo Method)

ray source: $^{252}$Cf 1.45Mbq
detector  : ALOKA Neutron Dose Meter TCS-451BS
arrangement for measurement (measured at the driver's seat of a special vehicle)

EPOXY RESIN COMPOSITION HAVING HIGH NEUTRON SHIELDING ABILITY, AND A TRANSPARENT SHIELDING MATERIALS FOR NEUTRON OBTAINED BY CURING SAID EPOXY RESIN COMPOSITION

BACKGROUND OF THE INVENTION

1. Field of the Invention

The present invention relates to an epoxy resin composition having high neutron shielding ability and excellent transparency, and also related to transparent shielding materials for neutron obtained by molding and curing said resin composition.

2. Description of the Prior Art

Recently, along with a wide range of nuclear industry and its application, for instance, nuclear power stations or nuclear fusion facilities such as nuclear reactor or fast breeder reactor, or neutron treatment institute used for medical treatment, the requirement for development of materials which are possible to shield neutron harmful to human body and protect from the adverse affect of neutron generated from said facilities is becoming more important. The development of a transparent shielding material which captures neutron effectively has been desired for a long time for the purpose to be used in the following applications; the remote controlling unit for above-mentioned facilities, various kinds of safety control tools for checking goods for operators inside the above mentioned facilities, protecting tools to prevent operators from neutron exposure in the emergency case such as neutron emission, or emergency rescue facilities and ambulance cars for emergency trouble such as neutron leakage.

There are two different kinds of radiation that are emitted in the above mentioned facilities and stations, that is, γ ray and neutron. Further, the secondary radiation from the above mentioned radiation must be considered from the standpoint of the shielding. Therefore, shielding materials also have to have shielding characteristics against this secondary radiation. Since the damping characteristics of γ ray and neutron indicate different values according to each substance, various combinations of many substances have been investigated. Concretes are generally in use as effective shielding material for both of γ ray and neutron. On the other hand, as the shielding materials for γ ray, lead can be used. However, as the mechanical strength of the medal is not so strong, the usage of lead is limited. Furthermore, water can be widely utilized as shielding material for thermal neutron and γ ray because the hydrogen atom content in water is high (refer to pages of 220 to 221 of Atomic Power Handbook, edited by Tadakazu Asada, Ohm Co., Ltd., 1976). Because water can be flowed by pump through the flowing section inside a nuclear reactor and is used as heat transfer medium and shielding material for neutron. Referring to the concrete, it can be said to be an excellent material for shielding neutron and is cheaper than other materials for shielding and the mechanical strength required to form a structure can be easily obtained. Therefore, it can be utilized for various parts of the facilities. However, structure of concrete itself is not transparent and it is impossible to watch the inside of the facility shielded by the concrete. In this indicates that concrete is different from watching through glass. As to shielding materials of neutron, materials of which the compositions are polyethylene resin and also relatively large content of boron compounds are known (Japanese Patent Publication 62-49305). Further, molding compounds which are composed mainly of boron minerals using thermoplastic hydrocarbon resins containing high number of hydrogen as binder (Japanese Patent Laid Open Publication 52-106097) are known. In case where epoxy resins are used as main component, the shielding material in which a fast neutron moderating layer composed mainly of epoxy resin with fine iron powders, a thermal neutron capturing layer containing boron (Japanese Patent Publication 4-47800), the cured products made by curing mixture containing epoxy resin, polyethylene, and inorganic boron compound with some kind of amine type hardeners (Japanese Patent Publication 4-67160) and cured products product of epoxy resin and filler with hardener in order to be used for nuclear fusion reactor's a supporting structure (Japanese Patent Laid Open Publication 60-387) have been proposed. However, regarding to transparency of neutron shielding material which this invention claims, any useful proposal has not yet being made now.

Aim of the Invention

The most important factors required for neutron shielding material are lower price and easier handling it. The shielding mechanism to capture neutron or thermal neutron is evaluated by the reduction of the neutron energy. It said that materials consisting of lower atomic number elements are more effective as neutron shielding material. Therefore, hydrocarbon compounds containing relatively large number of hydrogen atoms (such as, paraffin, polyethylene resin, epoxy resin or acrylic resin) are in use as shielding material for the structural parts of radiation treating facilities. As neutron shielding materials, only opaque structural parts which are made by blending an inorganic filler with some of chemical compounds, which have capability of radiation shielding and capturing performance of neutron such as boron added hydrocarbon compound are usually available. Regarding to any transparency in shielding material of neutron, any useful proposal has not yet been made at the present time. In the meantime, as a concrete example of transparent shielding material, lead glass with heavy density can be mentioned. However, its neutron shielding performance is low, and results in requiring very thick layer of it to attain sufficient shielding effect. Therefore, when it will be used, its actual weight will become very heavy. Furthermore, the durability of lead glass to water is very low and also the resistance against external shock is poor. Considering the above-mentioned present situation, the development of new shielding materials for neutron having the following features has been expected for a long time. Namely, it is figured that a material has excellent transparency like glass, good neutron shielding effect, strong mechanical strength, and good heat resistance not softened during a long term irradiation with lighting (heat wave), further, reduced in weight with reasonable price.

In view of the above mentioned situation, the inventors of this invention have conduced intensive studies to develop a neutron shielding material which is excellent at transparency and is easily molded, and it enabled us to have developed a transparent neutron shielding material which has high neutron shielding and its capturing capability. The aim of this invention is to provide an epoxy resin composition with neutron shielding capability for making a large size of shielding material with over 50 mm thickness economically, which is the required enough thickness to give sufficient neutron shielding performance, and another aspect of this invention is to provide a large size transparent molded product for neutron shielding.

BRIEF SUMMARY OF THE INVENTION

To attain the above-mentioned aim, the shielding material has to have following physical properties. Firstly, the material must be transparent. Secondly, the cured epoxy product must be excellent at shielding capability for delayed neutron. That is, it has the performance to moderate level of neutron energy. Thirdly, the shielding material has to be good for the mechanical strength and heat resistance. Fourthly, the shielding material is required to be thick and be molded in the form of bigger sizes.

In the present invention, the following methods and procedures were selected to meet the above-mentioned requirements.

Regarding the transparency mentioned as the first important requirement, it was able be solved not to blend any opaque inorganic compound for shielding for neutron, but to select a transparent epoxy resin and a hardener as starting materials and then to make its epoxy resin composition of which the curing can be made at ambient temperatures and subsequently any shape distortion will not occur.

As method to improve the neutron shielding capability, which is the second important physical property, it was adopted both to select epoxy resin and hardener, which contain a lot of hydrogen atom, which is the lowest atomic number. Subsequently, the neutron shielding performance was improved. When the number of hydrogen atoms per one molecule is relatively high, the fact that neutron shielding capability can be improved was confirmed by actual experiments, and the experimental results showed that the shielding material was decreased in its thickness thinner than conventional ones in order to attain the same shielding effectiveness. Consequently, it was possible that the neutron shielding material was lighter than usual. Further more it can handle easily.

Regarding the improvement in mechanical strength and heat resistance of which the above cured epoxy product has which is the third requirement, the cured product having desirable mechanical strength and heat resistance, which can be used practically was developed by use of the epoxy resin as thermosetting resin.

The shape of structures to which the shielding material of this invention is applied depends on their various applications and the molded products are desirable to be thicker in order to get a designed shielding capability. Therefore, with regarding to the fourth requirement, the method to cure the epoxy resin composition has required usually to control heat of curing reaction. In the epoxy resin composition of this invention, it is indispensable to control and remove properly heat of curing reaction in the molding step of the epoxy composition because any inorganic compound with high heat capacity to absorb the heat is not blended with the composition. If the above heat can not be controlled, a kind of strain molding phenomenon will occur and result in making not uniform molded body and subsequently bad transparent one, and in case where a transparent organic mold is used for molding, the mold itself is distorted in shape by the heat of curing reaction and consequently the molded product becomes distorted in shape. And there are cases where are found fish eyes or a kind of foams in the molded product to incur decrease in its shielding performance and its subsequent impractical use. Concerning the above facts, the inventors had studied to solve the problems and completed the following process method for molding.

(1) Epoxy resin composition is defoamed previously by vacuuming before the molding process,
(2) the defoamed composition is divided into small portions and casted into a mold intermittently,
(3) preventing foams from getting caught in the melt composition at melt flow in gate of the mold, the composition is hardened at ambient temperatures by use of an external removing method for heat of curing.

When a metallic mold is used, it is necessary to part the molded product from the mold. However, when a transparent organic mold is used, the transparent shielding material can be molded as one body with the mold to have been adhered tightly each other, and a multi layered shielding material can be obtained. Namely, said new multi layered shielding material characterizes that any parting step is not required.

That is, the essentials of this invention are use of a transparent epoxy resin composition with excellent neutron shielding capability, which can be cured at ambient temperatures. The said epoxy resin composition consists of an epoxy resin not to require any opaque inorganic compound for heat absorption of curing, and a hardener and the viscosity of said composition is lower than 7000 mPa·s at ambient temperatures.

DETAILED DESCRIPTION OF THE INVENTION

Figure 1:
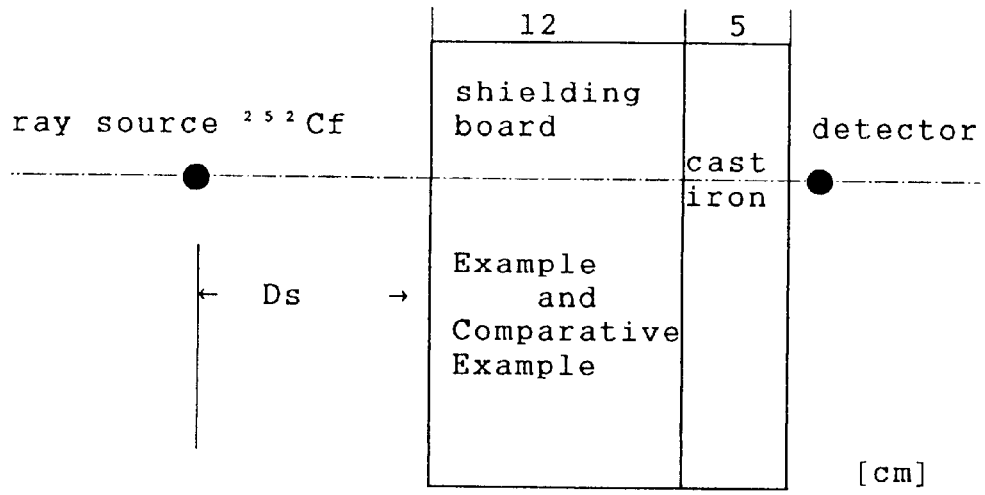
FIG. 1 is a typical layout of a ray source, a shielding source, a cast iron and a detector specified by the Monte Carlo method which calculates shielding performance for shielding board.

The present invention will be illustrated more in detail.

As epoxy resin for the epoxy resin composition of this invention, any kind of epoxy resin, which has more than 1.8 numbers of epoxy groups in one molecule and is liquid in the form at the ambient temperatures can be used. As typical examples of such kind of epoxy resin, aliphatic epoxy resins such as bisphenol A type epoxy resins, bisphenol F type epoxy resins, bisphenol S type epoxy resins, phenolnovolac type epoxy resins, alicyclic epoxy resins, heterocyclic epoxy resins, glycidylester type epoxy resins, glycidylamine type epoxy resins, brominated epoxy resins, cyclohexyl ring containing type epoxy resins or propyleneglycol type glycidylethers and urethane modified epoxy resins can be mentioned. One of these epoxy resins can be used alone or used together with each other more than two different kinds of these. Mono-functional and di-functional epoxy resins such as butylglycidylether, phenylglycidylether, credilglycidylether or glycidylether of aliphatic alcohol may be added if needed. Furthermore, suitable quantity of any epoxy resin which is solid in the form at ambient temperatures may be added. When higher level of neutron shielding performance will be necessary, epoxy resins with a lot of the number of hydrogen atoms in their one molecule are favorably in use. Aliphatic type epoxy resins, cyclohexyl ring containing type epoxy resins such as 4,4'-isopropylidenecyclohexanol type epoxy resins or alicyclic epoxy resins are typical of these. In the case of aliphatic type epoxy resins with higher content of hydrogene atoms, cured products of these resins have both of low heat resistance and mechanical strength. On the other hand, aromatic ring containing epoxy resins have good function of heat resistance and mechanical strength, but neutron shielding performance does not go well. As epoxy resins which are well-balanced in neutron shielding capability, heat resistance and mechanical strength, alicyclic epoxy resins or cyclohexyl ring containing epoxy resins can be preferable for this invention.

The epoxy resin composition of this invention can be prepared by blending a ambient temperature curing type of epoxy resin hardener with above mentioned epoxy resin hardeners to hard infusible thermoset networks. The type of epoxy resins which are used for this invention, reacts with epoxy resins to the above networks at ambient temperatures (15 to 45° C.) and in general, these give 10 minutes to several hours of pot life and need several 10 minutes to 10 days for curing, and are not restricted to the above description. Typical hardeners are figured in the following:

(1) ethylenediamine, diethylenetriamine, triethylenetetramine, tetraethylene pentamine, hexamethylenediamine, polyoxypropylenediamine, iminobishexyl amine etc.

(2) Alicyclic compounds with more than 2 amino groups which have active hydrogen atom to react with epoxy group at ambient temperatures as alicyclic and/or imino groups in a molecule as alicyclic polyamines such as
bis(amino)cyclohexane,
N-aminoethylpiperazine
3,9-bis(3-aminopropyle)2,4,8, 10-tetraoxapyro(5,5)undecan,
m-xylenediamine,
1-3bis(aminomethyl)cyclohexane,
N-aminoethylpiperazine,
bis(4-aminocyclohexyle)methane,
Isohoronediamine and
norbornadiamine (3) Further derivatives of above mentioned compounds, modified alicyclic polyamines such as ethyleneoxide adducts compound of aliphatic polyamines and epoxy resins addition compound, modified aliphatic polyamine modified polyethylenepolyamines, modified heterocyclic diamines, monoglycidilether adducts of alicyclic polyamines, epoxy resin adducts of acrylonitrile or aliphatic glycidilesters, polyamideamines and their modified ones that mean polycondensation products of polyethylenepolyamines and fatty acids or dimer acids in the amine system of polyethylene polyamines and xylirendiamines. One kind of these hardeners or a mixture of more than two different kinds of these hardeners can be used. When higher level of neutron shielding performance will be required, hardeners with higher content of hydrogen atoms in their one molecule. From this point of view, the use of aliphatic polyamines, alicyclic diamines and cyclic amines will be effective, however, especially in case of using aliphatic amines, since the heat generation by curing reaction is radical, it is important to select such a kind of amines of which curing reaction proceeds more slowly because these amines have tendency to generate heat of curing quickly. Therefore, use of the hardeners which rate of curing reaction has been managed by modificating reaction will be more effective. In any case of using hardeners, transparency of any cured epoxy resin product is the essential point for the selection of hardeners. Generally, transparency of the cured epoxy products is measured by luminous flax density. In case where the above cured products are applied to front parts of a special-purpose vehicle, level of the luminosity through the products is required to be higher than a regulation limit of luminosity by the Road Traffic Control Law of Japan. In the present invention, when illuminance under an adequate light source will be over 50%, the above products are assumed to have transparency.

The blending ratio of the above mentioned ambient temperature curing type epoxy resin hardener to epoxy resin to be used can be selected suitably to the kind of hardener to be used, and in general, desirable range of blending ratio of the hardener is 10 to 200 weight parts, favorably 20 to 100 weight parts per 100 weight parts of epoxy resin to be used.

In the present invention, curing accelerators, which can control the curing rate can be also used, and the chemical compounds which are generally used as curing accelerator for epoxy resins, such as imidazole, tertiary amines and phenols can be used, but not intended to be limited to them.

The use of the above mentioned epoxy resins and hardeners is essential for the epoxy resin composition to be used in the present invention. Besides the above curing accelerators, various kinds of additives, coupling agents, defoarming agents and/or coloring agents such as dyes can be added or blended if required, in the limitation not to the transparency, which is one of important aims of this invention.

Regarding the epoxy resin composition used in the present invention, its viscosity is also important. It is desirable that the composition's viscosity is adjusted to be level lower than 7000 mPa·s at ambient temperatures. When its level is over 7000 mPa·s, there are cases often where foams get caught in the melt composition and it will result in disadvantageous situation for making composition. On the other hand, when the viscosity is smaller than 500 mPa·s at ambient temperatures, chance for foams to get caught in the composition can be prevented from and subsequently excellent composition is made effectively.

Another aim of this invention is that the above-mentioned epoxy resin composition is molded by a casting method and then cured with the above-mentioned hardener to obtain a transparent neutron shielding material. Regarding the mold to be used for the molding process, it is not necessary to use special some of it, and any conventional mold is available in molding applications. Therefore, any metal type of mold or any organic transparent material type of it can be used. In case where a metallic mold is used, since it is necessary to decast the molded product from the mold, a parting agent must be previously coated over the surface of the mold, or it must be blend in the epoxy resin composition before its molding. In case where organic transparent mold is used, there are cases where the mold itself will be one body with the molded product, and as material for said transparent mold, a thermoplastic or thermosetting resin can be used. In this case, the kind of material is not restricted to the above mentioned, and any kind of transparent materials can be used. As the concrete examples, acrylic resin, vinylchloride resin, styrene resin, PMMA resin and polycarbonate resin are described, but not restricted to them.

Further, to prevent molded product from any contamination of dusts or particles in the working atmosphere, it is desirable to carry out molding procedure in a clean bench or a clean room with a clean level over class 100000.

Shape of this invention's molded product is not especially restricted, and it is able to meet any requirement of it if the molded product realizes the designed shielding performance for neutron, and the product is not restricted by the shape of the mold. The present invention is effective especially to obtain a large size of molded product with over 50 mm thickness. For example, a plate type of molded product can be mentioned (in the form 60×600×1000 mm). The shape of molded product can be designed to any kind of shapes, such as square, rectangular, cone, pyramid shapes or sphere one. Therefore, it is possible to design any desired shape for the structure to which the molded product will be set and to meet the requirement of neutron shielding performance.

EXAMPLE

The present invention will be illustrated by concretely through the following Examples, however not intended to be limited to them. Typical formulation figures for epoxy resin compositions are shown together with their physical and chemical properties in Table 1. Shielding boards of Examples 1 to 6 are molded by the process mentioned below, and neutron shielding performances and other properties are summarized in Table 4.

TABLE 1

| | | Examples | | | | | | |
|---|---|---|---|---|---|---|---|---|
| | | 1 | 2 | 3 | 4 | 5 | 6 | Comp. |
| formulation | epoxy resin A | 100 | 100 | 100 | | | 80 | |
| | epoxy resin B | | | | 100 | 100 | | |
| | epoxy resin C | | | | | | 20 | |
| | hardener A | 40 | | | | 50 | 50 | |
| | hardener B | | 40 | | 50 | | | |
| | hardener C | | | 16 | | | | |
| | polyethylene | | | | | | | 100 |
| content of H atom* (%) | | 10.3 | 10.3 | 10.9 | 7.9 | 7.9 | 8.1 | 14.3 |
| composition's viscosities at 25° C.(mPa · s) | | 2500 | 2500 | 2000 | 5000 | 4500 | 3500 | |

Comp.: comparative example
Epoxy resin A; Product of Tohto Kasei Co., Ltd. (Tokyo, Japan), trade name is ST-3000, 4,4'-isopropyridenecyclohexanol type epoxy resin whose epoxy equivalent is 230 g/eq. and its viscosity is 3000 mPa · s at 25° C.

TABLE 1-continued

| | Examples | | | | | | |
|---|---|---|---|---|---|---|---|
| | 1 | 2 | 3 | 4 | 5 | 6 | Comp. |

Epoxy resin B; Product of Tohto Kasei Co., Ltd., trade name is YD-128, BPA type epoxy resin whose epoxy equivalent is 189 g/eq. and its viscosity is 12000 mPa · s.
Epoxy resin C; Product of Tohto Kasei Co., Ltd., trade name is YH-300, trimethylolpropane type epoxy resin whose epoxy equivalent is 150 g/eq and its viscosity is 12000 mPa · s at 25° C.
Hardener A; Product of Tohto Resin Products Co., Ltd. (Tokyo Japan) trade name is HL-107, modified heterocyclicdiamine whose amine value is 327 mg/KOH
Hardener B; 3,9-bis(3-aminopropyl)2,4,8,10-tetraoxapyro(5,5)undecane
Hardener C; 1,3bis(aminomethyl)cyclohexan
Polyethylene; molded product with polyethylene resin 50 mm thick, whose density is larger than 0.950 g/cc and its molecule weight is over 30000.

Example 1

According to the formulation figure in Table 1, 3.0 kg weigh epoxy resin A and heat them to 34 to 35° C. Warmed 1.2 kg hardener at 20° C. and the resin A were mixed so that the temperature of the mixture was to 28 to 30° C. The viscosity of the mixture was 2500 mPa·s. Then the mixture was defoamed for 1 minute by a type of vacuum defoamer. A transparent mold made of acrylic resin (5 mm thick acrylic panel is used; rectangular shape mold with 50 mm×590 mm×990 mm inner size) was set in a clean bench. The mold which has been kept slant by use of a jack was inspected whether there is any contamination or not. (1st step) The results showed that the mold itself has no contamination.

4.5 kg of the mixture prepared in the 1st step were casted to the mold along the wall of gate of the mold during 5 minutes, paying attention not to any foam getting caught in the melt mixture at the end of gate. Then the mold was transferred into a bath for cooling and cooling water at 15±10° C. was poured into the bath to the same height as resin mixture one inside the mold. (2nd step)

The 1st process and the 2nd step were repeated 12 times. The height of cooling water was risen up to keep position slightly higher than it of the above mixture to be casted during every casting it.

The mold was filled with the above mixture after all casting steps, and height of cooling water was kept at the same level as before, and curing reaction has been continued for one over night (8 to 12 hours). Cooling water was circulated to keep temperature of the mixture at 15±10° C. during the curing. (3rd step)

Next morning, the mold was taken out of the above bath to the said clean bench. Thus a rectangular type for shielding board having dimension of 50 mm×590 mm×990 mm was obtained. The obtained board is a composite material composed of a mold made of 5 mm thick acrylic plate and a rectangular board of cured epoxy resin product with dimension of 50 mm×590 mm×990 mm.

The obtained shielding board did not contain any foams or fisheyes, and was uniform, and transparent without any stain, and its dimension was the same as designed one.

Example 2 to 6 and Comparative Examples

By use of the same process as Example 1 but using blending recipe of Table 1, composite materials of Example 2 to 6 and Comparative Examples composed of a mold made of 5 mm thick acrylic plate and a rectangular board of cured epoxy resin product with dimension of 50 mm×590 mm×990 mm were obtained. Polyethylene is used as comparative example.

Each of obtained transparent shielding materials for neutron was evaluated by the measuring methods to be mentioned below and the evaluation results are summarized in Table 4 (appearance, neutron shielding performance, luminous flax density, continuos irradiation test by use of a headlight and mechanical strengths).

(1) Appearance

The obtained shielding board is watched through from the viewpoint of its thickness direction through the naked eyes of one inspector. Its shape and dimension of foam inside the board were inspected.

(2) Evaluation of neutron shielding performance (method for calculation of neutron moderation)

Figure 2:
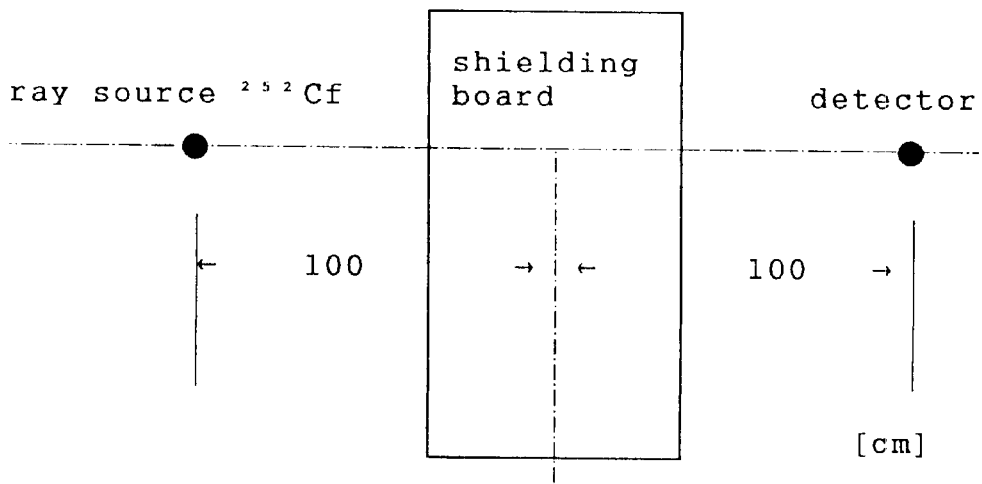
FIG. 2 is a typical arrangement of shielding performance measuring equipment.

For the evaluation of neutron shielding performance, a ray source, a shielding board, cast iron and detector are arranged as shown in FIG. 1, and the shielding performance of the shielding board of Example 1 is calculated by Monte Carlo method (refer to page 157 of Atomic Power Handbook, edited by Tadakazu Asada, Ohm Co., Ltd., Japan, 1976). Simulation results for shielding effect are shown in Table 2. Meanwhile, under the condition of practical use for shielding, the neutron shielding performance for Examples and Comparative Example are measured in accordance with the following measuring method: That is, $^{252}$Cf with 1.45 MBq is used as neutron ray source. Two pieces of the board with dimension of 60×600×1000 mm obtained in each Example are piled up in front part of the driver's seat of a special vehicle, and the ray source, a shielding board and a detector are arranged like the layout shown in FIG. 2. Then neutron is irradiated. ① is the results from the case where a shielding board is arranged, and ② is the results from the case where a shielding board is not arranged. Rate of ①/② is calculated.

The shielding performance for Example 1, which is the detailed example, is obtained by use of measured values listed in Table 3. The present invention has used the limitation to shielding performance, whose the level is smaller than ⅕VT.

(3) Illuminance

The vehicles of Mitsubishi type E-E74A of 1995 (headlamp; 4 beams) and Toyota type E-SV30 (headlamp; 2 beams) are used. Illuminance of the main travelling beam of said two vehicles are measured. Two pieces of transparent shielding board obtained in each Examples and Comparative Example are arranged together and set to front part of the main travelling beam and their illuminances are measured. Illuminance rate is defined by the ratio of illuminance value for no shielding board and the one with two pieces of piled shielding boards. Further, the illuminance for the above vehicles is prescribed by the Road Traffic Control Law (Japan) as follows:

That is, in the case of 4 beams system having head lamp vehicle whose main travelling beam and a sub travelling beam or a pass travelling beam do not make light at the same time, the illuminance per one beam is assumed to be over 15000 cd. And in the case of other 4 beams system having headlamp vehicle, the illuminance of the main beam is assumed to be over 12000 cd. Further, in the case of any vehicle except 4 beams system having headlamp, the illuminance per one beam is assumed to be over 15000 cd. Another essential requirement is that the illuminance for all above cases has to meet the prescribed value by the Road Traffic Control Law (Japan). The present invention has used the limitation to the illuminance whose the rate is over 50%.

(4) Heat Resistance

Considering so called softening phenomenon during a long term irradiation to the shielding material by head light, its heat resistance is measured on the basis of Bicut softening temperature testing method prescribed in JIS K7206 in the following.

Measuring condition:

Testing load: A method, 1 kgf

Temperature rising rate: 50° C./hr

TABLE 2

Neutron shielding effectiveness of shielding board (Monte Carlo method)

| shielding materials | irradiation dose $^{252}$CF(n/s) | Ds(m) in FIG. 1 | thickness of shielding (cm) | cast iron (cm) | neutron (μsv/h) | attenuation ①/② |
|---|---|---|---|---|---|---|
| Exp. 1 | 1.7 × 10⁵ | 1 | 12 | 0 | Pd in FIG. 1 | 1/4.31 |
| no shielding | 1.7 × 10⁵ | 1 | 0 | 0 | ①2.69 × 10⁻¹ ②1.16 × 10⁻⁰ | |
| Exp. 1 + cast iron | 1.7 × 10⁵ | 1 | 12 | 5 | ①1.91 × 10⁻¹ ②1.06 × 10⁻⁰ | 1/5.55 |
| no shielding | 1.7 × 10⁵ | 1 | 0 | 0 | | |
| Exp. 1 | 1.7 × 10⁵ | 4 | 12 | 0 | ①2.10 × 10⁻² ②8.94 × 10⁻² | 1/4.26 |
| no | 1.7 × 10⁵ | 4 | 0 | 0 | | |
| Exp. 1 + cast iron | 1.7 × 10⁵ | 4 | 12 | 5 | ①1.62 × 10⁻² ②8.89 × 10⁻² | 1/5.49 |
| no shielding | 1.7 × 10⁵ | 4 | 0 | 0 | | |

Shielding effectiveness 1/7.69 VT value of shielding material obtained in Example 1 is calculated by data in Table 3.

TABLE 3

Measured results of neutron shielding effectiveness for shielding board of Example 1

| | space dose ($\mu$Sv/h) | vehicle only ($\mu$Sv/h) | shielding board of Exp. 1 ($\mu$Sv/h) | vehicle Only ② | shielding board of Exp. 1 ① |
|---|---|---|---|---|---|
| | | | | neutron protection factor | |
| 1 | 0.54 | 0.27 | 0.02 | | |
| 2 | 0.54 | 0.40 | 0.04 | | |
| 3 | 0.31 | 0.30 | 0.06 | | |
| 4 | 0.52 | 0.42 | 0.03 | | |
| 5 | 0.56 | 0.28 | 0.03 | 0.61 | 0.08 |
| 6 | 0.56 | 0.22 | 0.03 | | |
| 7 | 0.50 | 0.26 | 0.04 | | |
| av | 0.50 | 0.31 | 0.04 | | |

Shielding effectiveness for Example 1 is calculated as follow;

①/②=0.08/0.61=1/7.69 VT and is smaller than ⅕ VT, which is a level of practice values. By the same method as the above, measured results are calculated and the results of Examples 2 to 6 and Comparative Example are obtained.

(5) Some Mechanical Strength

As some mechanical strength of a shielding material, compressive strength, compressive elasticity, flexural strength and hardness were measured in accordance with JIS K6911.

TABLE 4

| | Example | | | | | | Comparative |
|---|---|---|---|---|---|---|---|
| | 1 | 2 | 3 | 4 | 5 | 6 | Exp. |
| appearance (with the naked eye) | good | good | good | good | good | good | good |
| neutron shielding (1/VT) | 1/7.69 | 1/7.65 | 1/7.69 | 1/6.92 | 1/6.92 | 1/6.96 | 1/9.75 |
| luminance 4 beams (%) | 76.3 | 76.0 | 76.0 | 76.0 | 76.0 | 76.0 | — |
| luminance 2 beams (%) | 80.0 | 79.8 | 80.0 | 79.8 | 79.8 | 79.8 | — |
| heat resistance (° C.) | 210 | 211 | 215 | 220 | 230 | 180 | 129 |
| compressive strength (N/mm$^2$) | 60 | 59 | 75 | 69 | 70 | 63 | — |
| compressive elasticity (N/mm$^2$) | 1850 | 1800 | 2110 | 1990 | 2050 | 1750 | — |
| flexural strength (N/mm$^2$) | 69 | 65 | 72 | 69 | 70 | 63 | — |
| hardness (Shore D) | 87 | 87 | 89 | 88 | 88 | 85 | — |

Characteristic figure of shielding board obtained in Example 1 except Table 4 are shown in Table 5.

TABLE 5

Figure of characterization for Example1's board

| specific gravity | 1.08 g/cm$^3$ |
|---|---|
| H atom contents | 6.24 × 10$^{22}$ atom/cm$^3$ |

TABLE 5-continued

Figure of characterization for Example1's board

| 1/2 VT($^{252}$Cf neutron) | 5 cm |
|---|---|
| 1/10 VT($^{252}$Cf neutron) | 16.5 cm |
| elementary composition | |
| hydrogen | 8.34 wt % |
| carbon | 64.53 wt % |
| nitrogen | 2.93 wt % |

Attenuation for shielding effects for water and shielding board of Example 1 by Monte Carlo method CNP4A are shown in Table 6.

TABLE 6

| | | Attenuation coefficient (1/VT) | | |
|---|---|---|---|---|
| kinds of substance | | 1/5 | 1/10 | 1/100 |
| thickness (cm) | Example 1 | 11.3 | 15.0 | 33.5 |
| | water | 12.0 | 16.5 | 34.5 |

Effectiveness of the Invention

As mentioned above, in the present invention, ambient temperature curing epoxy resin composition to which consists of epoxy resin not including any opaque inorganic compound having neutron shielding capability and a hardener is used. And when the viscosity of the composition of the above mentioned epoxy resin will be lower than 7000 mPa·s at ambient temperatures, a non-distorted and transparent neutron shielding material with any distortion can be obtained.

What is claimed is:

1. A epoxy resin composition which, when cured, provides a transparent product having a high neutron shielding capability, said epoxy resin composition comprising a 4,4'-isopropylidenecyclohexanol type epoxy resin, without any non-transparent inorganic substance, and a hardener, said epoxy resin composition having a viscosity at ambient temperatures of less than 7000 mPa·s and being curable at said temperatures.

2. The epoxy resin composition of claim 1, wherein said hardener is selected from the group consisting of aliphatic amine, alicyclic amine, heterocyclic amine, heterocyclic diamine and modified products thereof.

3. A transparent neutron shield material produced from the epoxy resin composition which, when cured, provides a transparent product having a high neutron shielding capability, said epoxy resin composition comprising a 4,4'-isopropylidenecyclohexanol type epoxy resin, without any non-transparent inorganic sustance, and a hardener, said epoxy resin composition having a viscosity at ambient temperatures of less than 7000 mPa·s and being curable at said temperatures.

4. The transparent neutron shield material of claim 3, wherein said hardener is selected from the group consisting of aliphatic amine, alicyclic amine, heterocyclic amine, heterocyclic diamine and modified products thereof.

5. The transparent neutron shield material of claim 3 comprising a single body comprising a transparent mold and said epoxy resin composition.

* * * * *